(12) United States Patent
Donaldson (10) Patent No.: US 10,422,405 B2
(45) Date of Patent: Sep. 24, 2019

(54) ACTIVE STRUT CONTROL FOR VIBRATION ISOLATION OF LARGE PAYLOADS

(71) Applicant: The Boeing Company, Chicago, IL (US)

(72) Inventor: Jed E. Donaldson, Albuquerque, NM (US)

(73) Assignee: The Boeing Company, Chicago, IL (US)

(*) Notice: Subject to any disclaimer, the term of this patent is extended or adjusted under 35 U.S.C. 154(b) by 99 days.

(21) Appl. No.: 15/791,945

(22) Filed: Oct. 24, 2017

(65) Prior Publication Data

US 2019/0120320 A1 Apr. 25, 2019

(51) Int. Cl.
F16F 15/03 (2006.01)
F16F 15/00 (2006.01)

(52) U.S. Cl.
CPC ............ *F16F 15/03* (2013.01); *F16F 15/002* (2013.01); *F16F 2230/08* (2013.01); *F16F 2230/18* (2013.01)

(58) Field of Classification Search
CPC .......... F16F 15/03; F16F 9/361; F16F 15/002; F16F 2230/08; F16F 2230/18; G01M 7/022
See application file for complete search history.

(56) References Cited

U.S. PATENT DOCUMENTS

| | | | |
|---|---|---|---|
| 3,943,778 A | 3/1976 | Wyse | |
| 5,847,474 A | 12/1998 | Gruden et al. | |
| 6,003,849 A | 12/1999 | Davis et al. | |
| 6,196,514 B1 | 3/2001 | Kienholz | |
| 6,454,215 B1 | 9/2002 | Pedreiro | |
| 7,182,188 B2 | 2/2007 | Ruebsamen et al. | |
| 8,453,512 B2 | 6/2013 | Sasso et al. | |
| 8,763,996 B2 * | 7/2014 | Ishiguro | B60K 5/1283 267/140.14 |
| 9,103,403 B2 * | 8/2015 | Hadden | F16F 15/06 |
| 9,297,438 B2 | 3/2016 | Meacham et al. | |
| 9,423,000 B2 * | 8/2016 | Tan | F16F 15/0232 |

(Continued)

OTHER PUBLICATIONS

Davis et al., "Second generation hybrid D-Strut", SPIE Conf. Proc., vol. 2445 (1995), pp. 161-175.

(Continued)

*Primary Examiner* — Bradley Duckworth
(74) *Attorney, Agent, or Firm* — Ostrager Chong Flaherty & Broitman P.C.

(57) ABSTRACT

A system and a method that isolate a payload from the effects of vibrations by providing an active feedback path that enhances the isolation performance of a passive vibration isolation system at all relevant frequencies. The system comprises a kinematic arrangement of three bipod pairs of hybrid isolation struts to produce a fully kinematic suspension system. The active enhancement mechanism incorporates accelerometer feedback on each of the six hybrid isolation struts, blended with relative displacement measurements, to produce a transfer function that provides a specified alignment of a suspended component (with another component) at low frequency, but inertial stabilization at high frequency. Passive roll-off is produced by a series of disc flexures in each hybrid isolation strut.

22 Claims, 6 Drawing Sheets

(56) References Cited

U.S. PATENT DOCUMENTS

| | | | |
|---|---|---|---|
| 9,593,738 B2* | 3/2017 | Ito ......................... | F16F 15/005 |
| 9,777,793 B1* | 10/2017 | Chen ..................... | F16F 15/002 |
| 2008/0290624 A1* | 11/2008 | Yamanaka ............ | B60G 13/14 |
| | | | 280/124.154 |

OTHER PUBLICATIONS

Cobb et al., "Vibration isolation and suppression system for precision payloads in space", Smart Mater. Struct., 8 (1999), pp. 798-812.
Spanos et al., "A Soft 6-axis Active Vibration Isolator", Proc. American Control Conf., Seattle, WA, Jun. 1995, pp. 412-416.
Awtar et al., "Flexure Systems based on a Symmetric Diaphragm Flexure", Proceedings of the 20th Annual Meeting of the American Society for Precision Engineering, ASPE 2005—Norfolk, VA, United States.

* cited by examiner

ACTIVE STRUT CONTROL FOR VIBRATION ISOLATION OF LARGE PAYLOADS

BACKGROUND

This disclosure relates to the field of vibration damping and isolation. In particular, this disclosure relates to the provision of an active feedback path to enhance the isolation performance of a passive damping and isolation system.

In many applications, it is desirable to isolate sensitive equipment from the effects of vibration. The vibration energy may originate either through base motion transmission, as seen in dynamic vehicle applications, or through disturbances emanating on or near the isolated equipment, or both.

Passive isolation is the dominant existing solution for large system isolation, but suffers from the following shortcomings: (1) minimal low-frequency auto-alignment capability; (2) requirements of large clearance (sway space) around the isolator due to resonant amplification; (3) poor high-frequency isolation due to the fact that damping must be included to reduce the amount of requisite sway space; and (4) an inability to reduce the amplitude of isolation side disturbances In a passive isolator, the amount of isolation is related to the available sway space and the amount of displacement allowable at resonance. This dictates the frequency and damping characteristics, effecting the transmission function. It also allows the isolator to displace under accelerations and rotations at frequencies below the isolator resonance (and at DC). This displacement of the isolator is not desirable in systems where nominal auto-alignment with respect to the aircraft is required, as in directed energy applications.

While passive isolators provide exceptional isolation at high frequency (above 2 times the resonant frequency), passive isolators amplify disturbances at low frequencies. This deficiency in passive isolators is due primarily to the resonant characteristics of the flexure components of the passive isolators. In addition, in passive isolators the frequency dependence of the vibration damping is not easily tailored, since tailoring the damping typically requires changing the stiffness elements and/or the damping fluid.

In contrast, active damping isolation systems provide desirable vibration damping at low frequencies, and the frequency dependence of the vibration damping and isolation transmissibility of active isolators can be easily tailored. However, active isolators are typically more complex, and are higher in weight than comparable passive isolators. In addition, active isolators require power for operation, and as such, become inoperable upon a power failure. Accordingly, the use of only active isolators may reduce reliability.

There is a need for improved damping isolation systems that provide desirable vibration damping at high and low frequencies.

SUMMARY

The subject matter disclosed in detail below is directed to a system and a method that isolate a payload (such as a precision instrument) from the effects of vibrations onboard a vehicle (such as an aircraft or a spacecraft). The proposed system and method provide an active feedback path to enhance the isolation performance of a passive vibration isolation system at all relevant frequencies. In particular, a structural isolation apparatus (referred to hereinafter as a "hybrid isolation strut") is disclosed that includes passive isolation mechanisms and an active enhancement mechanism.

More specifically, the proposed system comprises a kinematic arrangement of three pairs of struts that form respective bipods to produce a fully kinematic suspension system. The active enhancement mechanism incorporates accelerometer feedback on each of the six hybrid isolation struts, blended with relative displacement measurements of each hybrid isolation strut, to produce a transfer function that provides a specified alignment of the suspended component (e.g., a laser bench of a laser system) with some other component (e.g., a beam control bench of the laser system) at low frequency, but inertial stabilization at high frequency. Passive roll-off is produced by a series of (e.g. two or more) disc flexures in each strut.

The concept disclosed herein allows for active alignment at low frequency by rejection of variations in the magnitude or direction of the gravitational vector, and rejection of other forces as would be seen in aircraft maneuvers. The concept also allows for a substantial reduction in required sway space over conventional passive isolators and offers the opportunity to reduce the isolator frequency and reduce the required damping. Both of these reductions serve to increase the amount of high-frequency attenuation achieved. The active component also allows the rejection of equipment-induced vibration by internal model control. The strictly passive approach known in the art only allows for minimal reduction of equipment-induced vibration due to the fact that no path exists to transmit the energy off the isolator, other than that achieved through a damper (the system proposed herein has no damper).

In accordance with one embodiment, the hybrid isolation strut comprises lightly damped disc flexures and an electromagnetic actuator (such as a Lorentz force actuator) defined by a coil movable relative to a stationary permanent magnet. Such an electromagnetic actuator will be referred to herein as a "voice coil actuator". The hybrid isolation strut further comprises a vibration sensor for measuring the acceleration of the shaft and a displacement sensor for measuring the axial displacement of the shaft relative to the housing. The outputs from the vibration sensor and the displacement sensor are filtered and then blended into a control signal for use in a feedback loop that controls the amount of current supplied to the voice coil actuator. The blended control signal gives the hybrid isolation strut good performance at all relevant frequencies. The vibration sensor and displacement sensor are located along the strut axis so that when the strut is placed in an appropriate kinematic configuration (triple bipod), all six degrees of freedom (DoF) (three translational and three rotational) are observable and controllable utilizing single-input/single-output control techniques. This improves the isolator performance at all relevant frequencies. It also allows active control of vibrations originating on the payload side of the isolation suspension.

Although various embodiments of systems and methods for isolating a payload carried onboard a vehicle from the effects of vibrations are described in some detail later herein, one or more of those embodiments may be characterized by one or more of the following aspects.

One aspect of the subject matter disclosed in detail hereinafter is an apparatus comprising: a shaft having first and second ends and an axis; a first coupling attached to the first end of the shaft; a housing surrounding at least a portion of the shaft and having a bottom wall; a second coupling attached to the bottom wall of the housing; a first disc flexure connecting the shaft to the housing; a second disc flexure connecting the shaft to the housing, the first and second disc flexures being separated by a distance along the length of the shaft; a vibration sensor attached to the shaft at a position between the first and second disc flexures; a displacement sensor attached to the housing and configured to output a displacement signal representing an axial displacement of the shaft; and a voice coil actuator comprising a first portion attached to the second end of the shaft and a second portion attached to the bottom wall of the housing.

In accordance with one embodiment of the apparatus described in the preceding paragraph, the first portion of the voice coil actuator comprises a permanent magnet, the second portion of the voice coil actuator comprises a coil made of electrically conductive material, the vibration sensor comprises an accelerometer configured to output an acceleration signal representing an acceleration of the shaft, the displacement sensor comprises an eddy current probe, the first coupling comprises a flexure universal joint or a ball joint and the second coupling comprises a ball joint. That embodiment further comprises a controller that supplies current to the coil. The controller is configured to control the amount of current supplied to the coil as a function of fused sensor feedback derived from the acceleration signal and the displacement signal.

In one proposed implementation, the controller is configured to derive the fused sensor feedback by: (a) double integration of the acceleration signal to form a doubly integrated acceleration signal; (b) high-pass filtering the doubly integrated acceleration signal; (c) low-pass filtering the displacement signal; (d) summing the high-pass-filtered doubly integrated acceleration signal and the low-pass-filtered displacement signal; and (e) filtering the summed high-pass-filtered doubly integrated acceleration signal and low-pass-filtered displacement signal.

Another aspect of the subject matter disclosed in detail hereinafter is a system comprising a base, a payload and a payload vibration isolation system on which the payload is suspended and coupled to the base. The payload vibration isolation system comprises: first and second struts arranged to form a first bipod in which axes of the first and second struts intersect at a first strut axes intersection point; third and fourth struts arranged to form a second bipod in which axes of the third and fourth struts intersect at a second strut axes intersection point; and fifth and sixth struts arranged to form a third bipod in which axes of the fifth and sixth intersect at a third strut axes intersection point. Each of the first through sixth struts comprises: a shaft having a first end coupled to the platform and an axis; a housing surrounding at least a portion of the shaft and having a bottom wall coupled to the base; a first disc flexure connecting the shaft to the housing; a second disc flexure connecting the shaft to the housing, the first and second disc flexures being separated by a distance along the length of the shaft; a vibration sensor attached to the shaft at a position between the first and second disc flexures; a displacement sensor attached to the housing and configured to output a displacement signal representing an axial displacement of the shaft; and a voice coil actuator comprising a first portion attached to another end of the shaft and a second portion attached to the one end of the housing.

In accordance with one embodiment of the system described in the preceding paragraph: (a) each of the first, second and third strut axes intersection points have the same elevation when the system is in a quiescent state; (b) the elevation of the first, second and third strut axes intersection points is higher than an elevation of a center of mass of the suspended platform; and (c) the axes of the first and second struts lie in a first vertical plane, the axes of the third and fourth struts lie in a second vertical plane, the axes of the fifth and sixth struts lie in a third vertical plane, and the first, second and third vertical planes are not parallel to each other.

A further aspect of the subject matter disclosed in detail hereinafter is a method for isolating a payload from vibrations in a base, comprising: (a) suspending the payload on first through sixth struts, each of the first through sixth struts comprising a shaft having a first end coupled to the platform, a housing surrounding at least a portion of the shaft and having a bottom wall coupled to the base, a pair of disc flexures having outer peripheries connected to the housing and inner peripheries connected to the shaft, and a voice coil actuator configured to exert an axial force on the shaft in response to receipt of electrical current; (b) generating a respective acceleration signal representing an acceleration of a respective shaft for each of the first though sixth struts; (c) generating a respective displacement signal representing a displacement of a respective shaft relative to a respective housing for each of the first though sixth struts; (d) generating a respective fused sensor signal from the respective acceleration signal and respective displacement signal; and (e) sending a respective electrical current to a respective voice coil actuator for each of the first though sixth struts, which respective electrical current is a function of the respective fused signal, wherein resulting forces generated by the voice coil actuators compensate for vibrations in the base by counteracting forces exerted on the platform by those vibrations. The bottom wall of the housing is coupled to the base in a manner that enables motion having three rotational degrees of freedom.

In accordance with one embodiment of the method described in the preceding paragraph, the acceleration and displacement signals are blended to produce a transfer function that provides a specified alignment of the payload with another component at low frequencies, but inertial stabilization at high frequencies.

Other aspects of systems and methods for isolating a payload from the effects of vibrations onboard a vehicle are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, a system and a method for isolating a payload carried onboard a vehicle from the effects of vibrations will now be described in some detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
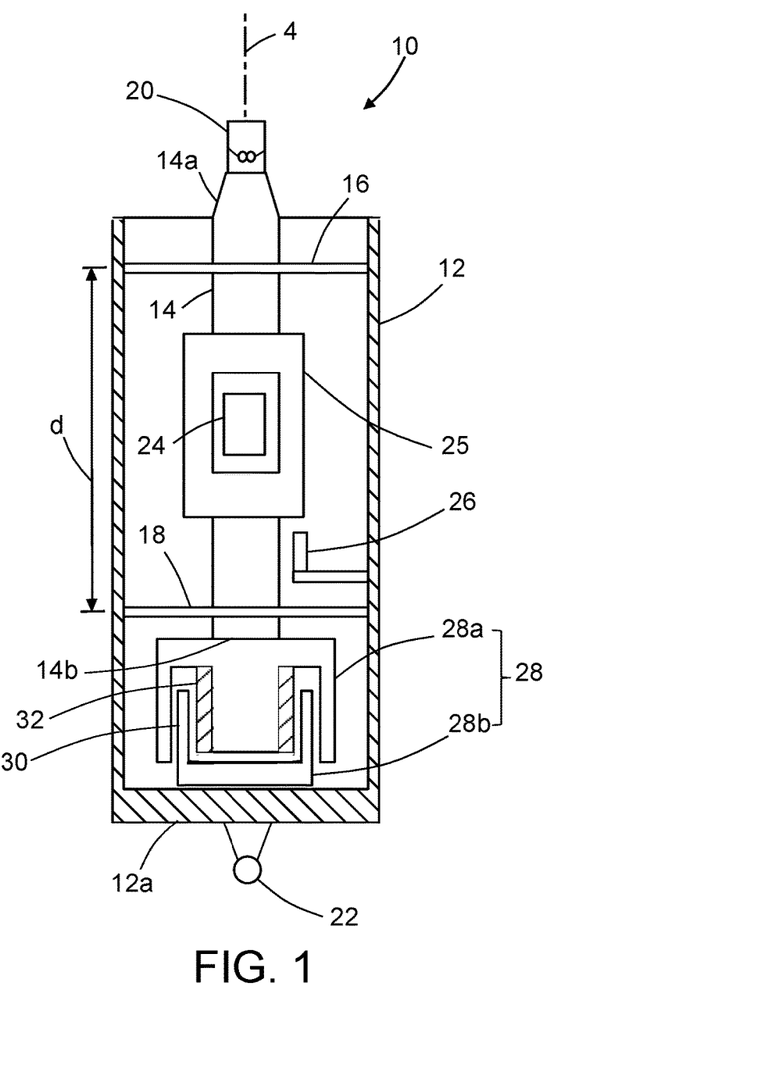
FIG. 1 is a diagram representing a partially sectional view of a hybrid isolation strut in accordance with one embodiment.
Figure 2A:
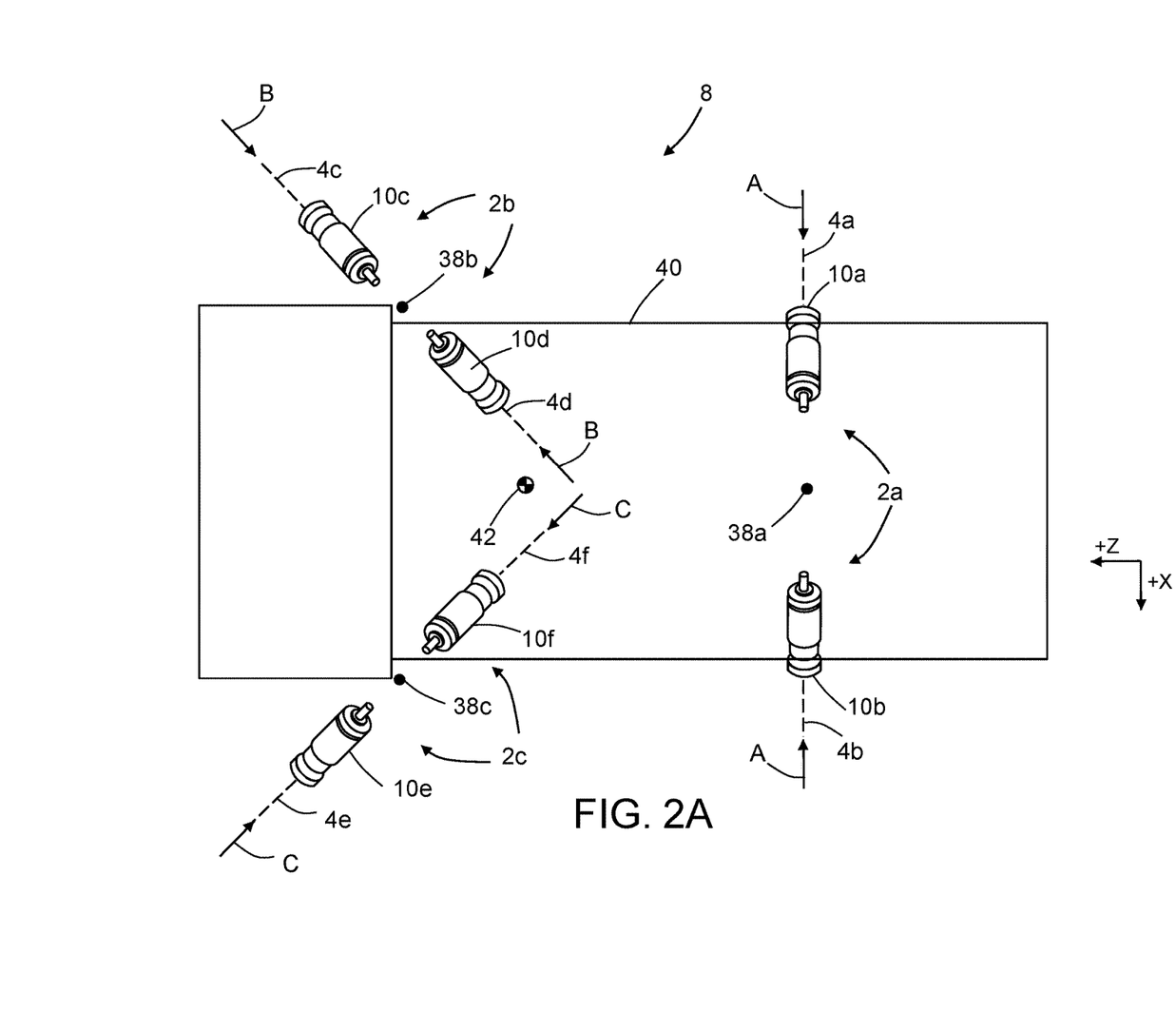
FIG. 2A is a diagram representing a top view of one example of a three-bipod arrangement of hybrid isolation struts that supports a payload.

FIG. 1 is a diagram representing a partially sectional view of a hybrid isolation strut 10 having a strut axis 4 in accordance with one embodiment. This hybrid isolation strut 10 has no damping chamber. In accordance with the embodiment depicted in FIG. 1, the hybrid isolation strut 10 comprises a housing 12 (shown in section) that is coupled to a base (such as base 44 seen in FIG. 2B) and a shaft 14 that has a first end 14a coupled to a payload (such as payload 40 shown in FIG. 2). The first end 14a of shaft 14 is coupled to the payload 40 by a first coupling 20, which may be a flexure universal joint or a ball joint depending on design requirements. A bottom wall 14a of the housing 12 is coupled to the base 44 by a second coupling 22 (e.g., a ball joint) that allows three-rotational-degree-of-freedom (DOF) motion at the base attachment point. The second coupling 20 allows at least two-rotational-DOF motion at the platform attachment point.

The hybrid isolation strut 10 depicted in FIG. 1 further comprises a pair of lightly damped disc flexures 16 and 18 (hereinafter "first disc flexure 16" and "second disc flexure 18") which flexibly couple shaft 14 to housing 12. Each disc flexure has an outer periphery connected to the housing 12 and an inner periphery connected to the shaft 14. The first disc flexure 16 connects a first portion of the shaft 14 to a first portion of the housing 12; the second disc flexure 18 connects a second portion of the shaft 14 to a second portion of the housing 12. The first and second disc flexures 16 and 18 are separated by a distance d along the length of the shaft 14. The first disc flexure 16 is disposed between the flexure universal joint 20 and the second disc flexure 18; the second disc flexure 18 is disposed between the ball joint 22 and the first disc flexure 16. A flexure is a flexible element (or combination of elements) engineered to be compliant in specific degrees of freedom. A flexure can be used to reproduce almost perfect linear motion, but the length of travel of this very accurate motion is limited. A disc flexure (a.k.a., "diaphragm flexure") is linear. Disc flexures are commonly used for providing motion in the direction normal to the flexure plane. Because of its geometry, in addition to translation parallel to the Z axis, the strut is also compliant in roll and pitch motions (i.e., rotations about the X and Y axes) due to the ball joint. Any disc flexure made from thin sheet metal will be very stiff in the two planer directions, X and Y, and in yaw (i.e., rotation about the Z axis). The disc flexures are typically made of spring steel, but may be another material based on design requirements. A typical disc flexure comprises two flexural elements that are separated by a parallel body.

Basically, the first and second disc flexures 16 and 18 should provide one linear compliance along the strut axis 4 and five constraints (three rotations and two translations). In cases where the second coupling 22 is a ball joint, that ball joint produces three rotational compliances and three translational constraints. In cases where the first coupling 20 is a flexure universal joint, that flexure universal joint provides two rotational compliances and three translation constraints and one rotational constraint.

The hybrid isolation strut 10 depicted in FIG. 1 further comprises a vibration sensor 24 and a displacement sensor 26. The vibration sensor 24 may be attached to the shaft 14 at a position between the first and second disc flexures 16 and 18; the displacement sensor 26 may be attached to the housing 12 at a position also between the first and second disc flexures 16 and 18. The displacement sensor 26 is configured to output a displacement signal representing an axial displacement of the shaft 14.

The hybrid isolation strut 10 depicted in FIG. 1 further comprises a voice coil actuator 28 for enhancing the vibratory and shock dissipation provided by the first and second disc flexures 16 and 18 and allowing control of strut force or stroke. The voice coil actuator 28 comprises a first portion 28a attached to a second end 14b of the shaft 14 and a second portion 28b attached to the bottom wall 12a of the housing 12.

A voice coil actuator has a linear dependence between force and applied current over a wide frequency range (e.g., 0 to 20 kHz). This linear relationship, coupled with current feedback in the control electronics, yields an actuator that is simple, accurate and high bandwidth. The force constant is dependent on current and stroke.

The first portion 28a of the voice coil actuator 28 depicted in FIG. 1 comprises a permanent magnet 32 mounted to the second end 14b of the shaft 14. The second portion 28b of the voice coil actuator 28a voice coil 30 wound on a bobbin attached to the bottom wall 12a of housing 12. The voice coil 30 comprises an electrically conductive coil capable of producing electromagnetic forces when energized. The voice coil 30 is preferably constructed to prevent eddy currents that adversely affect the dynamic response of the actuator. More specifically, the voice coil 30 and magnet 32 are configured so that the magnet 32 is axially displaceable relative to the stationary voice coil 30 upon the application of current from a controller 34 (see FIG. 3) to the voice coil 30.

As previously described, the hybrid isolation strut 10 depicted in FIG. 1 comprises a vibration sensor 24 aligned with the strut axis and a displacement sensor 26 for measuring the displacement of the shaft 14/magnet 32 (relative to the housing 12) in an axial direction of the shaft 14. In accordance with one embodiment, the vibration sensor 24 is an accelerometer which measures the acceleration of the payload. The displacement sensor 26 measures the axial displacement of the shaft 14 relative to the housing 12. The vibration sensor 24 is contained within a sensor housing 25, which may be a hollow tubular structure that houses the vibration sensor 24 and then during assembly would be affixed to the shaft 14 by threads. In the case wherein the vibration sensor 24 is an accelerometer, this allows a load path around the vibration sensor 24, but enables measurement of the acceleration along the length of the shaft 14. The displacement sensor 26 may comprise an eddy current probe that creates an inductive field that spans the gap between it and the electrically conductive shaft 14 without physical contact. In alternative embodiments, a linear variable differential transformer may be used.

Figure 2B:
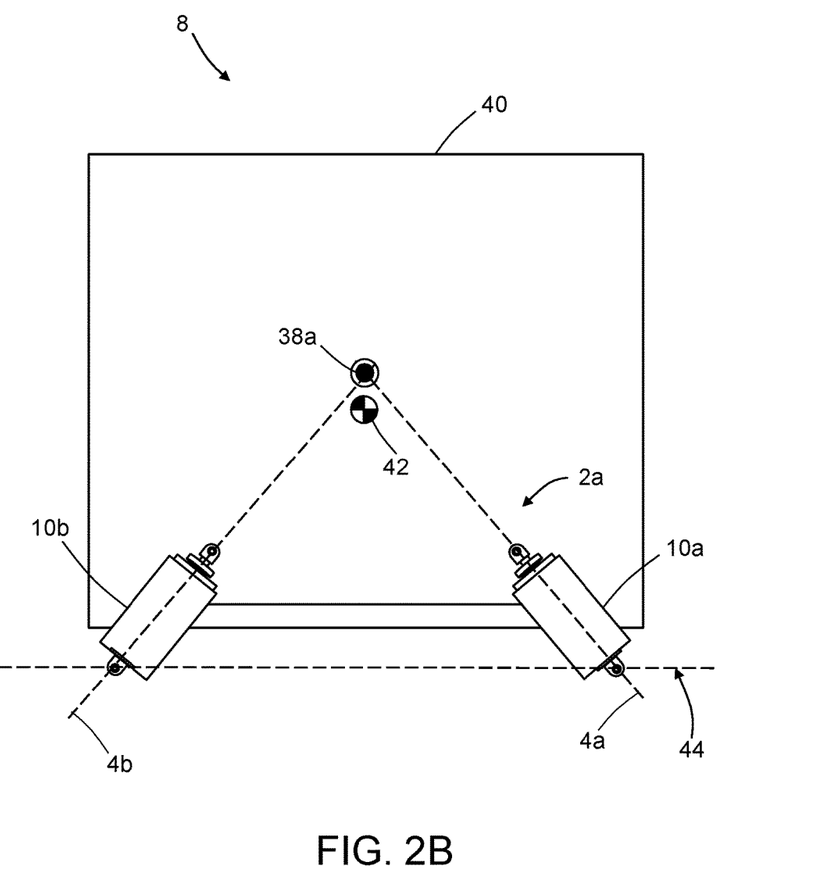
FIG. 2B is a diagram representing an end view of the example three-bipod arrangement of hybrid isolation struts depicted in FIG. 2A.

Six hybrid isolation struts 10a-10f of the type depicted in FIG. 1 can be coupled in pairs to a payload 40 (see FIGS. 2A and 2B) to form an arrangement of three bipods 2a-2c that provide both passive and active isolation. FIGS. 2A and 2B are diagram representing top and end views respectively of a system 8 comprising a payload 40, a base 44, and an arrangement of three bipods 2a-2c which couple the payload 40 to the base 44. (Only the housing of the suspended payload 40 is visible in FIG. 2A.) For example, the payload 40 may be a precision instrument such as a telescope or a laser weapon. The location in a horizontal plane of the suspended center of mass 42 of the payload 40 is indicated by a small circle with filled and empty quadrants in FIG. 2A. The location of the suspended center of mass 42 in a vertical plane is shown in FIG. 2B, which is a diagram representing an end view of the example three-bipod arrangement depicted in FIG. 2A (hybrid isolation struts 10c-10f have been omitted to avoid clutter in the drawing).

The three-bipod arrangement depicted in FIG. 2A comprises: a first bipod 2a formed by a first pair of hybrid isolation struts 10a and 10b having respective axes 4a and 4b that lie in a vertical plane A and intersect at a strut axes intersection point 38a; a second bipod 2b formed by a second pair of hybrid isolation struts 10c and 10d having respective axes 4c and 4d that lie in a vertical plane B and intersect at a strut axes intersection point 38b; and a third bipod 2c formed by a third pair of hybrid isolation struts 10e and 10f having respective axes 4e and 4f that lie in a vertical plane C and intersect at a strut axes intersection point 38c. The vertical planes A, B and C (indicated by opposing pairs of arrows in FIG. 2A) are planes perpendicular to the plane of the drawing. In one example implementation, the vertical planes B and C of bipods 2b and 2c may be oriented at respective angles of +140° and −140° with respect to the vertical plane A of bipod 2a, meaning that there would be an angle of about 80° between vertical planes B and C; the respective axes 4a and 4b of struts 10a and 10b are disposed at an angle of 40° relative to a horizontal plane; and the respective axes 4c-4f of struts 10c-10f are disposed at an angle of 36° relative to the same horizontal plane. It should be appreciated, however, that these angles are merely examples. In addition, the strut axes intersection points 38a through 38c are located at the same elevation when the system is in a quiescent state, which elevation is slightly higher than the elevation of the suspended center of mass 42. This feature can be seen in FIG. 2B. The dashed horizontal line in FIG. 2B represents the base 44 to which the ball joints 22 of hybrid isolation struts 10a-10f are rotatably coupled. In this configuration, the bipods 2a-2c form a fully kinematic suspension system that isolates the payload 40 from vibrations in base 44.

Figure 3:
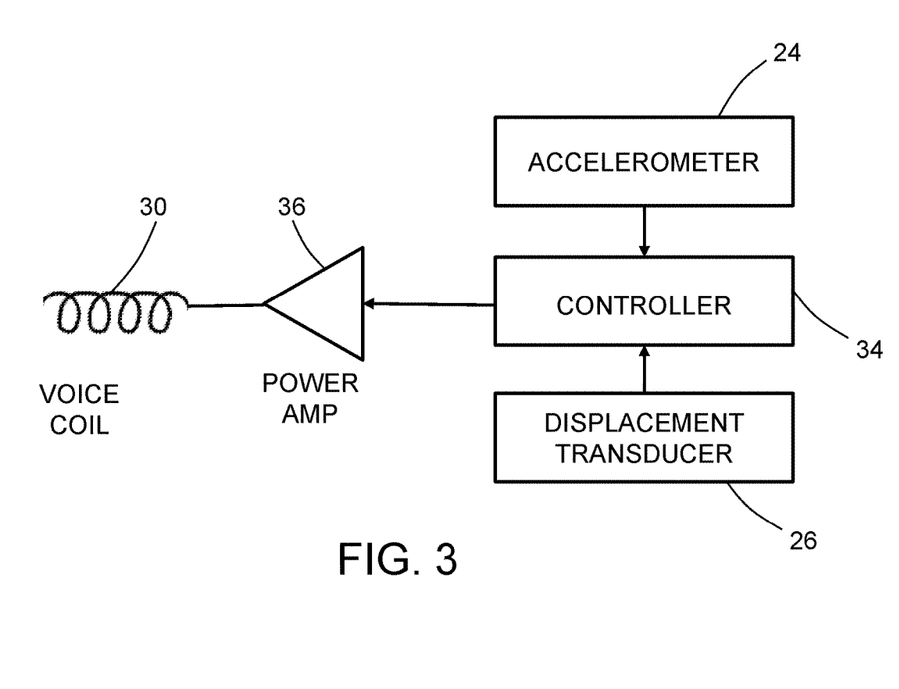
FIG. 3 is a block diagram identifying additional components of a payload isolation system in accordance with one embodiment.

FIG. 3 is a block diagram identifying additional components of a payload isolation system in accordance with one embodiment. This payload isolation system includes a controller 34 that controls the amount of current provided to the voice coils 30 of the hybrid isolation struts 10a-10f depicted in FIG. 2A. More specifically, each voice coil 30 receives current from a respective current-controlled power amplifier 36. The power amplifier 36 receives control signals from the controller 34 and then supplies electrical current to the voice coil 30 in accordance with the control signals from the controller 34.

As shown in FIG. 3, the outputs from the vibration sensor 24 and from the displacement sensor 26 of each hybrid isolation strut 10a-10f are transmitted to the controller 34, which is configured to filter and then blend the outputs from vibration sensor 24 and displacement sensor 26 into a respective control signal for use in a feedback loop that controls the amount of current supplied to each voice coil 30. The blended control signal improves the hybrid isolation strut performance at all relevant frequencies. The vibration sensor 24 and displacement sensor 26 are located along the strut axis 4 (see FIG. 1) so that when the struts 10 are placed in an appropriate kinematic configuration (triple bipod), all six degrees of freedom (three translation, three rotation) are observable and controllable utilizing single-input/single-output control techniques. This improves the isolator performance at all relevant frequencies. It also allows active control of vibrations originating on the payload side of the isolation suspension.

Figure 4:
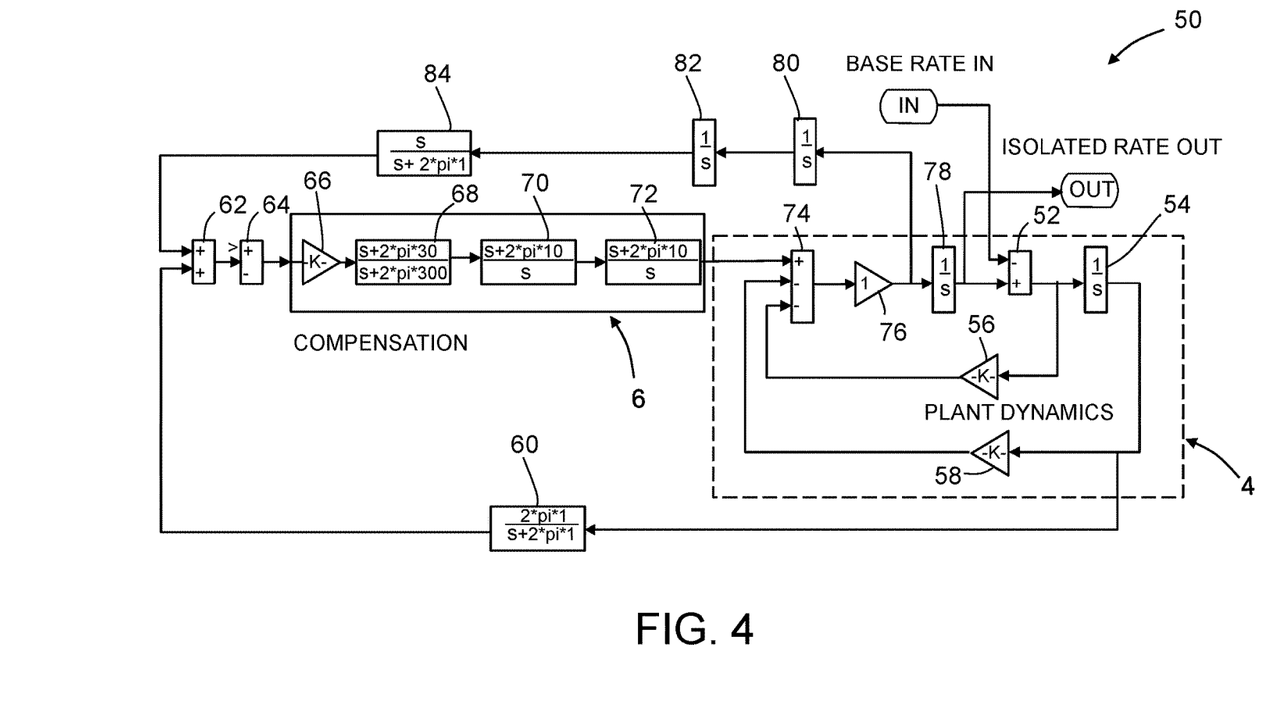
FIG. 4 is a block diagram representing a control model of a single hybrid isolation strut in accordance with one embodiment.

FIG. 4 is a block diagram representing a control model of a single hybrid isolation strut in accordance with one embodiment. In process control, block diagrams are a visual language for describing actions in a complex system in which blocks are black boxes that represent mathematical or logical operations that occur in sequence, not the physical components that perform those operations. This control model is designed for controlling the hybrid isolation strut using a control action in an optimum manner without delay or overshoot and ensuring control stability. The input labeled "Base Rate In" in FIG. 4 is the rate input (i.e., linear and angular velocities) that would be imparted at the lower end of each hybrid isolation strut by motion of some type of host vehicle. One embodiment contemplates an aircraft. The output labeled "Isolated Rate Out" is the rate of payload motion produced after the isolation effects of control model 50 have been realized. In other words, the control model 50 takes the base rate in as input and the system creates (by electrical, mechanical, sensor and computer means) the "Isolated Rate Out"

To accomplish the foregoing, that controller 34 provides the desired payload isolation by executing the operations identified in the control model of FIG. 4. Those operations include: integration in the frequency domain (represented in the control model by integrators 54, 78, 80 and 82); filtering (represented in the control model by transfer functions 60, 68, 70, 72 and 84; summation (represented in the control model by summing junctions 52, 62, 64 and 74); and applying force (represented in the control model by gains 56, 58, 66 and 76).

Still referring to FIG. 4, the plant dynamics block 4 includes summing junction 74, gain 76, integrator 78, summing junction 52, integrator 54, gain 56 and gain 58. Gain 56 is a damping term and models the damping force inherent in the material of the first and second disc flexures 16 and 18 (not due to fluid damping). Gain 58 models the forces produced by the first and second disc flexures 16 and 18, which forces are a function of the spring constant of the disc flexures (the stiffness of two discs can be calculated as a single stiffness parameter because the discs are in a parallel arrangement) and the axial displacement of the shaft 14 relative to the housing 12. The damping term (gain 56) is $2*zeta*w_n*m$; it is just masked over. This is related to the mass and stiffness of the system as well as the damping coefficient (zeta). The stiffness term (gain 58) is $w_n^2*m$; it is also masked over. This is the natural frequency $w_n$ of the mechanical system squared: $w_n=\text{sqrt}(k/m)$, where k is the stiffness coefficient and m is the lumped mass.

The compensation block 6 includes the gain 66 and transfer functions 68, 70 and 72. Inside the compensation block 6: gain 58 is a loop gain that sets the open loop crossover frequency (or bandwidth); transfer function 68 is a lead filter; and transfer functions 70 and 72 are respective integrators broken by 10-Hz zeros. The frequency values of all these filters are variables that depend on the plant dynamics, so they would be determined based on how closely a particular design related to the model. In more generic terms, the compensation block 6 includes a loop gain that sets bandwidth, two broken integrators for high open loop gain, and a lead filter for stability.

The output from the compensation block 6 is the force applied by the voice coil actuator 28 (see FIG. 1). The forces exerted by the first and second disc flexures 16 and 18 and the damping force are subtracted from the force applied by the voice coil actuator in summing junction 74. The output of summing junction 74 is then multiplied by gain 76, which models the lumped mass for a single strut. The output of gain 76 is the accelerometer signal, which is integrated by integrator 78 to derive the inertial motion representing the rate at which the payload must move in order to compensate for the base rate. That compensating payload rate is the output of the control model depicted in FIG. 4.

A further aspect of the control model is that the base rate is subtracted from the payload rate in summing junction 52, the output of which is then integrated by integrator 54 to derive the axial displacement of the shaft 14 relative to the housing 12. The displacement signal is operated on by a transfer function 60 that models a low-pass filter, while the acceleration signal is doubly integrated by integrators 80 and 82 to derive the inertial position, following which the doubly integrated acceleration signal is operated on by a transfer function 84 that models a high-pass filter. The low- and high-pass filters have partially overlapping pass bands. The outputs of the low- and high-pass filters are summed in summing junction 62 and then are blended with a complementary filter to achieve sensor fusion.

In the present case, the controller 34 monitors the outputs of the vibration sensor 24 and displacement transducer 26, blends those outputs together, and then issues control signals for controlling the voice coil actuators 28 as a function of the blended signal in accordance with the control laws incorporated in the control model of FIG. 4. In accordance with one proposed implementation, the controller 34 is a digital signal processor (DSP) configured to execute the control laws. In accordance with another proposed implementation, the controller 34 is a field-programmable gate array (FPGA) configured to execute the control laws. The control laws would be mapped from what is seen inside the compensation block 6 to discrete space using the Z-transform. This in turn can be cast in terms of difference equations that will be executed by the FPGA or DSP.

The term "lumped mass" used above refers to the fact that the simple concept model shown in FIG. 4 is not complete in terms of the system level. It is only the model of a single strut. Six such models would need to be interfaced with the appropriate geometry, mass and inertia to achieve the total payload isolation system. FIG. 2A shows what a generic physical arrangement would look like. A dynamics model that represents the system in FIG. 2A would include six strut models arranged in a representative geometry (in this case a kinematic geometry), an inertia tensor (3×3) matrix as well as center-of-mass location and magnitude. The kinematic geometry indicates that there is a precise and unique mathematical relationship between the displacement of each strut and the six degrees of freedom of the system. (three rotations and three translations).

Figure 5:
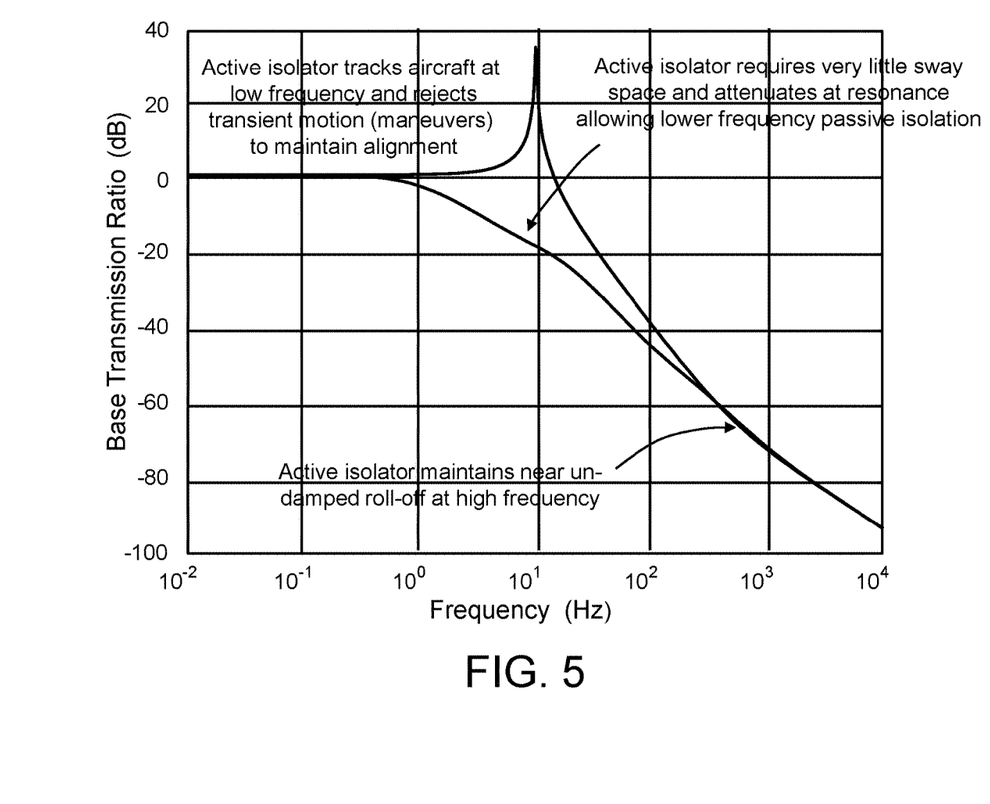
FIG. 5 is a Bode diagram showing the open and closed loop base motion transmission function in accordance with one simulation. The upper curve with the sharp peak is for an uncompensated strut; the lower curve having a portion that crosses under the sharp peak is for a strut having compensation in accordance with the control model represented in FIG. 4.

FIG. 5 is a Bode diagram showing the open and closed loop base motion transmission function in accordance with one simulation. The upper curve with the sharp peak is for an uncompensated strut; the lower curve having a portion that crosses under the sharp peak is for a strut having compensation in accordance with the control model 50 represented in FIG. 4. The leftmost portion of the lower curve shows that the simulated active Isolator disclosed herein tracks an aircraft at low frequency and rejects transient motion (maneuvers) to maintain alignment of the precision instrument with some other component. The middle portion of the lower curve shows that the simulated active isolator requires very little sway space and attenuates at resonance, allowing lower-frequency passive isolation. The rightmost portion of the lower curve shows that the simulated active isolator maintains near un-damped roll-off at high frequency.

In the case where the payload is a laser bench of a laser weapons system, the payload isolation system should be designed so that the isolator "displaces" at low frequency due to the fact that there are alignment requirements for laser systems. Typically the isolated laser is on a bench of its own that passes the laser onto a beam control bench. When the aircraft banks or makes a maneuver, it will cause the isolator to "displace". The displacement sensor loop rejects this tendency and forces the system (using the voice coils) to maintain its low-frequency alignment. Each effect is mathematically represented in FIG. 5 by frequency regions of the included Bode plot. The low frequencies $10^{-1}$ to $10^0$ Hz are produced by the displacement sensor, the middle frequencies $10^0$ to $10^2$ Hz are produced by the accelerometer and the high frequencies $>10^2$ Hz are produced by the passive characteristics of the strut (i.e., the first and second disc flexures 16 and 18).

Thus the payload isolation system proposed herein solves a number of the problems that are characteristic of passive isolation schemes. Those problems include: low-frequency auto alignment, high-frequency roll-off and middle-frequency high-amplitude sway space requirements. It also allows for the attenuation of isolation side-induced vibration due to equipment operation or other factors.

While systems and methods for isolating a payload from the effects of vibrations onboard a vehicle have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. An apparatus comprising:
a shaft having first and second ends and an axis;
a first coupling attached to the first end of the shaft;
a housing surrounding at least a portion of the shaft and having a bottom wall;
a second coupling attached to the bottom wall of the housing;
a first disc flexure connecting the shaft to the housing;
a second disc flexure connecting the shaft to the housing, the first and second disc flexures being separated by a distance along the length of the shaft;
a vibration sensor attached to the shaft at a position between the first and second disc flexures;
a displacement sensor attached to the housing and configured to output a displacement signal representing an axial displacement of the shaft; and
a voice coil actuator comprising a first portion attached to the second end of the shaft and a second portion attached to the bottom wall of the housing.

2. The apparatus as recited in claim 1, wherein the first portion of the voice coil actuator comprises a permanent magnet and the second portion of the voice coil actuator comprises a coil made of electrically conductive material.

3. The apparatus as recited in claim 1, wherein the vibration sensor comprises an accelerometer configured to output an acceleration signal representing an acceleration of the shaft.

4. The apparatus as recited in claim 3, further comprising a controller that supplies current to the coil, wherein the controller is configured to control the amount of current supplied to the coil as a function of fused sensor feedback derived from the acceleration signal and the displacement signal.

5. The apparatus as recited in claim 4, wherein the controller is configured to derive the fused sensor feedback by:
double integration of the acceleration signal to form a doubly integrated acceleration signal;
high-pass filtering the doubly integrated acceleration signal;
low-pass filtering the displacement signal;
summing the high-pass-filtered doubly integrated acceleration signal and the low-pass-filtered displacement signal; and
filtering the summed high-pass-filtered doubly integrated acceleration signal and low-pass-filtered displacement signal.

6. The apparatus as recited in claim 1, wherein the displacement sensor comprises an eddy current probe.

7. The apparatus as recited in claim 1, wherein the second coupling comprises a ball joint.

8. A system comprising a base, a payload and a payload vibration isolation system on which the payload is suspended and coupled to the base, wherein the payload vibration isolation system comprises:
first and second struts arranged to form a first bipod in which axes of the first and second struts intersect at a first strut axes intersection point;
third and fourth struts arranged to form a second bipod in which axes of the third and fourth struts intersect at a second strut axes intersection point; and
fifth and sixth struts arranged to form a third bipod in which axes of the fifth and sixth intersect at a third strut axes intersection point,
wherein each of the first through sixth struts comprises:
a shaft having a first end coupled to the platform and an axis;
a housing surrounding at least a portion of the shaft and having a bottom wall coupled to the base;
a first disc flexure connecting the shaft to the housing;
a second disc flexure connecting the shaft to the housing, the first and second disc flexures being separated by a distance along the length of the shaft;
a vibration sensor attached to the shaft at a position between the first and second disc flexures;
a displacement sensor attached to the housing and configured to output a displacement signal representing an axial displacement of the shaft; and
a voice coil actuator comprising a first portion attached to a second end of the shaft and a second portion attached to the bottom wall of the housing.

9. The system as recited in claim 8, wherein each of the first, second and third strut axes intersection points have the same elevation when the system is in a quiescent state.

10. The system as recited in claim 9, wherein the elevation of the first, second and third strut axes intersection points is higher than an elevation of a center of mass of the suspended platform.

11. The system as recited in claim 8, wherein the axes of the first and second struts lie in a first vertical plane, the axes of the third and fourth struts lie in a second vertical plane, the axes of the fifth and sixth struts lie in a third vertical plane, and the first, second and third vertical planes are not parallel to each other.

12. The system as recited in claim 8, wherein the first portion of the voice coil actuator comprises a permanent magnet and the second portion of the voice coil actuator comprises a coil made of electrically conductive material.

13. The system as recited in claim 8, wherein the vibration sensor comprises an accelerometer configured to output an acceleration signal representing an acceleration of the shaft.

14. The system as recited in claim 13, further comprising a controller that supplies current to the coil, wherein the controller is configured to control the amount of current supplied to the coil as a function of fused sensor feedback derived from the acceleration signal and the displacement signal.

15. The system as recited in claim 14, wherein the controller is configured to derive the fused sensor feedback by:
double integration of the acceleration signal to form a doubly integrated acceleration signal;
high-pass filtering the doubly integrated acceleration signal;
low-pass filtering the displacement signal;
summing the high-pass-filtered doubly integrated acceleration signal and the low-pass-filtered displacement signal; and
filtering the summed high-pass-filtered doubly integrated acceleration signal and low-pass-filtered displacement signal.

16. The system as recited in claim 8, wherein the displacement sensor comprises an eddy current probe.

17. The system as recited in claim 8, wherein each of the first through sixth struts comprises a ball joint that couples the housing of the strut to the base.

18. A method for isolating a payload from vibrations in a base, comprising:
suspending the payload on first through sixth struts, each of the first through sixth struts comprising a shaft having a first end coupled to a platform, a housing surrounding at least a portion of the shaft and having a bottom wall coupled to the base, a pair of disc flexures having outer peripheries connected to the housing and inner peripheries connected to the shaft, a vibration sensor attached to the shaft at a position between the pair of disc flexures, a displacement sensor attached to the housing, and a voice coil actuator configured to exert an axial force on the shaft in response to receipt of electrical current;

generating a respective acceleration signal representing an acceleration of a respective shaft for each of the first though sixth struts using the respective vibration sensor;

generating a respective displacement signal representing a displacement of a respective shaft relative to a respective housing for each of the first though sixth struts using the respective displacement sensor;

generating a respective fused sensor signal from the respective acceleration signal and respective displacement signal; and sending a respective electrical current to a respective voice coil actuator for each of the first though sixth struts, which respective electrical current is a function of the respective fused signal, wherein resulting forces generated by the voice coil actuators compensate for vibrations in the base by counteracting forces exerted on the platform by those vibrations.

19. The method as recited in claim 18, wherein the bottom wall of the housing is coupled to the base in a manner that enables motion having three rotational degrees of freedom.

20. The method as recited in claim 18, wherein the acceleration and displacement signals are blended to produce a transfer function that rejects a tendency of the payload to displace relative to another component at low frequencies and provides inertial stabilization at high frequencies.

21. The method as recited in claim 20, wherein the payload is a laser bench of a laser weapons system and the other component is a beam control bench of the laser weapons system.

22. The method as recited in claim 18, wherein generating a respective fused sensor signal comprises:

doubly integrating the acceleration signal to form a doubly integrated acceleration signal;

high-pass filtering the doubly integrated acceleration signal;

low-pass filtering the displacement signal;

summing the high-pass-filtered doubly integrated acceleration signal and the low-pass-filtered displacement signal; and filtering the summed high-pass-filtered doubly integrated acceleration signal and low-pass-filtered displacement signal.

* * * * *